United States Patent [19]

Suszko et al.

[11] 4,265,468
[45] May 5, 1981

[54] INFLATABLE RESTRAINT SYSTEM

[75] Inventors: Donald H. Suszko, Warren; John F. Zens, Algonac, both of Mich.

[73] Assignee: General Motors Corporation, Detroit, Mich.

[21] Appl. No.: 54,633

[22] Filed: Jul. 3, 1979

[51] Int. Cl.³ .............................................. B62D 21/08
[52] U.S. Cl. .................................. 280/729; 280/732; 280/740
[58] Field of Search .............. 280/728, 729, 730, 732, 280/736, 740

[56] References Cited

U.S. PATENT DOCUMENTS

| | | | |
|---|---|---|---|
| 3,586,347 | 6/1971 | Carey et al. | 280/729 |
| 3,610,657 | 10/1971 | Cole | 280/729 |
| 4,136,894 | 1/1979 | Ono et al. | 280/729 |

FOREIGN PATENT DOCUMENTS 964693  3/1975  Canada .................................... 280/729

*Primary Examiner*—John J. Love
*Assistant Examiner*—Michael Mar
*Attorney, Agent, or Firm*—Edward J. Biskup

[57] ABSTRACT

An inflatable cushion for a vehicle having a bench seat which accommodates three seated occupants. The cushion is stored opposite the right-hand seat occupant and incorporates a baffle for causing the gas flow to be directed towards the side portions of the cushion so as to quickly position the cushion in front of the center seat occupant.

4 Claims, 5 Drawing Figures

INFLATABLE RESTRAINT SYSTEM

This invention relates to inflatable restraint systems and more particularly concerns an inflatable cushion assembly employing baffle means for facilitating the filling of the side portions of the cushion.

More specifically, the cushion assembly according to the invention is intended for use with a vehicle body having a seat including a seat cushion and a seat back for supporting a driver, a center seat occupant and a right-hand seat occupant in seated positions. The cushion assembly is combined with the usual gas generator and diffuser and is housed in a folded condition within a support housing fixedly mounted to the instrument panel of a vehicle and located substantially opposite the right-hand seat occupant. A torso cushion forms a part of the cushion assembly and is attached to the diffuser which has a plurality of openings for allowing gas to flow into the cushion for inflating the latter whereby the cushion assumes a position for receiving impact of the center and right-hand seat occupants' torsos. In the area of its attachment with the diffuser, the torso cushion has a transverse length that is substantially greater than the longitudinal length of the diffuser. A baffle is located within the inflatable cushion in spaced relationship with the diffuser and positioned in the path of gas flow. The baffle has a transverse size that substantially equals the longitudinal length of the diffuser so as to cause the gas flowing from the diffuser to be directed sideways to thereby facilitate filling of the side portions of the torso cushion to quickly locate the latter in front of the center seat occupant.

The objects of the present invention are to provide a new and improved inflatable restraint system which has a cushion provided with a baffle for diverting gas flow towards the side portions of the cushion; to provide a new and improved restraint cushion for a vehicle body having a bench seat for accommodating three seated occupants and wherein the cushion incorporates a baffle for causing the gas flow to be directed sideways relative to the diffuser so as to quickly locate the cushion in front of the center and right-hand seat occupants; to provide a new and improved inflatable restraint system wherein the cushion has a sleeve-like baffle with open sides and is attached to the diffuser and has a portion thereof located in front of the diffuser for directing gas flow towards the side portions of the cushion; and to provide a new and improved inflatable restraint system having a sleeve attached to the gas generator-diffuser combination that is located in the path of gas flow and has a transverse length substantially equal to the longitudinal length of the diffuser.

Other objects and advantages of the invention will be more apparent from the following detailed description when taken with the drawings in which.

Figure 1:
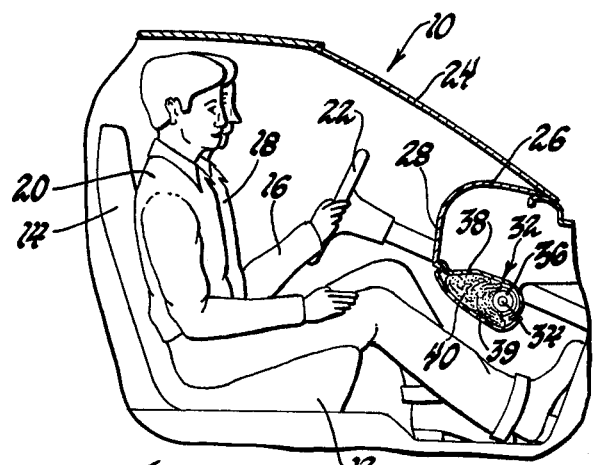
FIG. 1 is a side elevational schematic diagram of the front portion of a vehicle passenger compartment provided with an instrument panel which houses an inflatable restraint system having a cushion assembly made in accordance with the invention.
Figure 3:
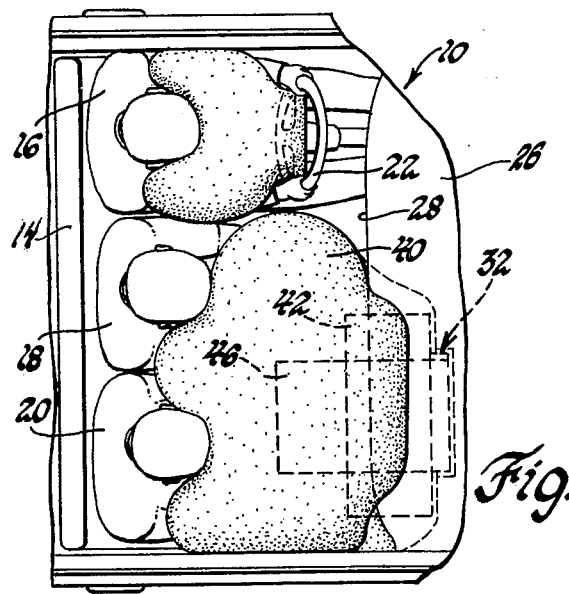
FIG. 3 is a plan view taken on line 3—3 of FIG. 2 showing the deployed cushion assembly being impacted by the center seat occupant and right-hand seat occupant within the passenger compartment of the vehicle and also shows the deployed steering wheel cushion being impacted by the driver.

Referring now to the drawings and more particularly to FIGS. 1 and 3 thereof, a vehicle 10 is illustrated schematically and includes a front bench type seat having a seat cushion 12 and a seat back 14 for supporting three occupants in seated positions. As best seen in FIG. 3, the front seat accommodates a driver 16, a center seat occupant 18 and a right-hand seat occupant 20 with the driver 16 being positioned behind a conventional steering wheel 22 which extends through the fire wall for connection with the dirigible wheels of the vehicle. Each of the occupants 16, 18 and 20 is indicated as being a 95th percentile male seated in the front seat of the vehicle 10.

The vehicle 10 is equipped with the usual instrument panel, located adjacent a windshield 24 and includes an upper surface 26 and a frontal surface 28 located in generally spaced relationship to the seat back 14 and torso of each of the seated occupants 16, 18 and 20. An inflatable restraint system 32 made according to the invention is supported beneath the instrument panel and includes an inflator or gas generator 34 which provides a source of high temperature pressure fluid when activated. The gas generator 34 is concentrically located within a generally cylindrical elongated diffuser 36 which extends between end plates of a J-shaped housing 38 secured to the vehicle opposite the right-hand seat occupant. A hinged closure 39, made of plastic material or the like, normally closes the lower portion of the housing 38 and is releasably held against movement until such time as the inflatable restraint cushion is activated.

Figure 2:
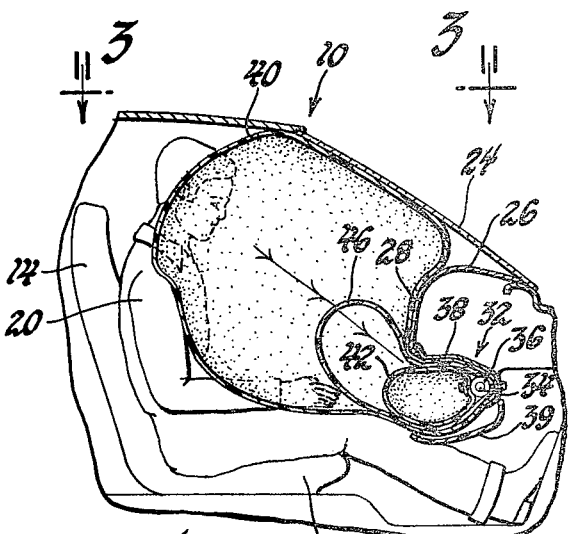
FIG. 2 is a view similar to FIG. 1 with the cushion assembly deployed.
Figure 5:
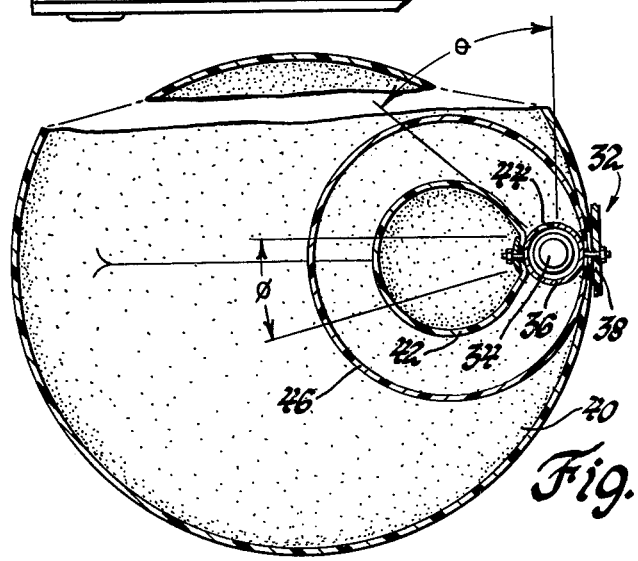
FIG. 5 is a side cross-sectional view of the cushion assembly according to the invention and illustrates the relative sizes of the various parts thereof when formed in a circular configuration.

As seen in FIGS. 1, 2 and 5, the gas generator-diffuser combination is located within the closed confinement of a main or torso cushion 40, a portion of which is fixedly held between the diffuser 36 and the housing 38. Attached to the front portion of the diffuser 36 is a knee cushion 42 which, when inflated, helps maintain the center seat occupant and right-hand seat occupant is seated positions as explained in Cole U.S. Pat. No. 3,610,657, which issued on Oct. 5, 1971 and is assigned to the assignee of this invention.

Figure 4:
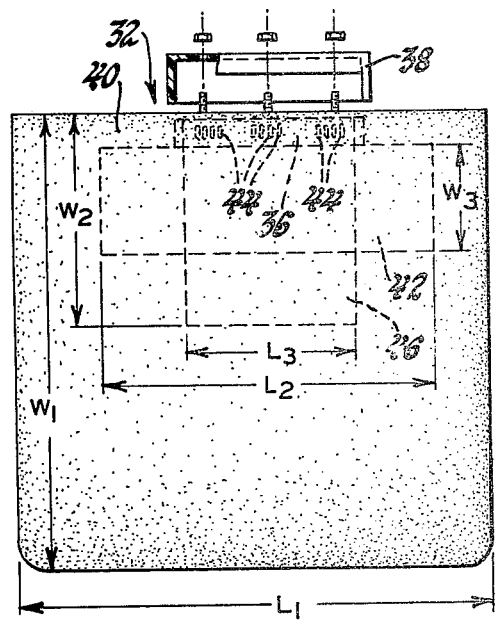
FIG. 4 is a plan view showing the cushion assembly in a deflated state and combined with a diffuser prior to installation into its support housing.

The diffuser 36 is provided with two rows of axially spaced slots with one set of slots 44, as seen in FIG. 4, serving to direct pressurized fluid to the torso cushion 40 for inflating the latter, while the other set of slots (not shown) serve to direct the pressurized fluid to the knee cushion 42 for inflating the latter. Thus, the torso and knee cushions are separately supplied with pressurized fluid with the knee cushion 42 being made from an impervious material, while the torso cushion 40 is made of a porous material so as to allow gas to escape and reduce rebound upon impact. As seen in FIG. 5, the slots 44 will direct an upward flow of pressurized fluid, which will fan out as indicated by the angle $\theta$, while the set of slots communicating the interior of the diffuser 36 with the knee cushion 42 will cause the pressurized fluid to fan out as indicated by the angle $\phi$. If desired, Zens U.S. Pat. No. 3,791,671 may be referred to for a more detailed showing of a diffuser formed with two rows of slots for separately supplying pressurized fluid to a torso cushion and a knee cushion.

As seen in FIG. 4, the torso and knee cushions 40 and 42 are longer in transverse length than the accommodating housing 38. As a result, after being combined with the diffuser 36 and prior to installation into the housing 38, the side edges of the torso cushion 40 must be folded inwardly towards each other after which the cushion assembly is rolled upon itself for storage into the housing 38 as described in Klove, Jr. et al U.S. Pat. No. 3,618,978. Because the side portions of the cushion assembly are folded inwardly as described and also because the restraint system is normally positioned substantially opposite the right-hand seat occupant, the cushion assembly, during inflation, will unroll towards the right-hand seat occupant with the center sections of cushions 40 and 42 tending to fill first and afterwards permitting the side sections to fill. In other words, there is a momentary delay in the filling of the side portions of the cushion and, therefore, the positioning of the cushion in front of the center seat occupant and the right-hand seat occupant does not occur at exactly the same time. In order to decrease the time for the torso cushion to be positioned in front of the center seat occupant, the cushion assembly made according to this invention employs a baffle 46 which takes the form of a sleeve with a portion thereof attached to the diffuser 36 between the outer surface thereof and the secured portion of the torso cushion 40 as seen in FIG. 5. The baffle 46 is made from the same material as the knee cushion and has open sides and preferably has a transverse length substantially equal to the longitudinal length of the diffuser 36. Also, the baffle 46 is located in the path of the gas flow emanating from the slots 44 formed in the diffuser which, as indicated hereinbefore, fan out and provide the flow pattern as indicated by the angle $\theta$. In this manner, the baffle 46 causes the gas flow from the diffuser 36 to the torso cushion 40 to be directed sideways and thereby facilitates filling the side portions of the torso cushion 40 so as to quickly locate the torso cushion in front of the center occupant 18.

An inflatable restraint system 32 made according to the invention has been tested successfully utilizing a torso cushion 40 with a transverse length $L_1$ as seen in FIG. 4, which measured 1,334 mm. The diffuser 36 had a longitudinal length equal to 526.5 mm, an outer diameter of 75 mm, and there were 24 slots 44 formed therein each of which measured approximately 40 mm by 3.5 mm. The knee cushion 42 had a transverse length $L_2$, which measured 924 mm and the baffle 46 had a transverse length $L_3$ which measured 508 mm. With the cushion assembly deflated and laid flat as seen in FIG. 4, the width $W_1$ of the torso cushion measured 1,225 mm, the width $W_2$ of the baffle 46 measured 577.5 mm, and the width $W_3$ of the knee cushion measured 305 mm. The gas generator in the tested system had a gas output sufficient to increase the internal pressure of a closed 10.6 cubic foot tank from ambient pressure to 40 psi gage in 80 milliseconds.

As seen in FIG. 5, the inflatable restraint system 32 is shown with the cushions 40 and 42 and the baffle 46 having a circular cross-sectional configuration. Although this arrangement is not an accurate representation of the actual configurations assumed by the cushions 40 and 42 and the baffle 46 when the cushion assembly is fully inflated, it is presented to illustrate the relative sizes of the cushions and the baffle using the widths set forth above as the circumferences of respective circles. In such case, it will be noted that the baffle 46 has a diameter substantially equal to the radius of the torso cushion 40, while the diameter of the diffuser 36 is substantially equal to one-half of the radius of the baffle 46.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. In combination with a vehicle body including a seat having a seat cushion and a seat back for supporting a driver, a center seat occupant and a right-hand seat occupant in seated positions, an instrument panel having a front surface juxtaposed to the seat back and torsos of the seated occupants, an inflatable restraint system for said center seat occupant and said right-hand seat occupant, said inflatable restraint system being located in said instrument panel substantially opposite said right-hand seat occupant and comprising a housing fixedly mounted to said instrument panel, a gas generator carried by said housing and including a diffuser of a predetermined length with the longitudinal axis thereof being disposed transversely of the vehicle body, an inflatable cushion attached to said diffuser, said diffuser having a plurality of openings for allowing gas to flow into said inflatable cushion for inflating the latter whereby said inflatable cushion assumes a position for receiving impact of said center seat and right-hand seat occupants' torsos, said inflatable cushion having a transverse length substantially greater than the longitudinal length of said diffuser, and expandable baffle means made of a flexible material located within said inflatable cushion and positioned in the path of gas flow from said diffuser, said baffle means having openings at the opposite ends thereof and being spaced from said diffuser and having a transverse dimension substantially equal to the length dimension of said diffuser so as to cause the gas flowing from said diffuser to be directed sideways to fill the side portions of said inflatable cushion to quickly locate said inflatable cushion in front of said center seat occupant.

2. In combination with a vehicle body including a seat having a seat cushion and a seat back for supporting a driver, a center seat occupant and a right-hand seat occupant in seated positions, an instrument panel having a front surface juxtaposed to the seat back and torsos of the seated occupants, an inflatable restraint system for said center seat occupant and the right-hand seat occupant, said inflatable restraint system being located in the instrument panel substantially opposite the right-hand seat occupant and comprising a housing fixedly mounted to said instrument panel, a gas generator carried by said housing and including a diffuser of a predetermined length with the longitudinal axis thereof being disposed transversely of the vehicle body, an inflatable cushion attached to said diffuser, said diffuser having a plurality of openings for allowing gas to flow into the cushion for inflating the latter whereby the cushion assumes a position for receiving impact of the center seat and right-hand seat occupants' torsos, said inflatable cushion having a transverse length substantially greater than the longitudinal length of said diffuser, and a sleeve attached to said diffuser and located within said inflatable cushion, said sleeve having a portion thereof positioned in the path of gas flow from said diffuser and serving as a baffle for causing the gas flowing from the diffuser to be directed sideways to fill the side portions of the inflatable cushion to quickly locate the cushion in front of the center seat occupant.

3. In combination with a vehicle body including a seat having a seat cushion and a seat back for supporting a driver, a center seat occupant and a right-hand seat occupant in seated positions, an instrument panel having a front surface juxtaposed to the seat back and torso of each of the seated occupants, an inflatable restraint system for said center seat occupant and the right-hand seat occupant, said inflatable restraint system being located in the instrument panel substantially opposite the right-hand seat occupant and comprising a housing fixedly mounted to said instrument panel, a gas generator carried by said housing and including a diffuser of a predetermined length with the longitudinal axis thereof being disposed transversely of the vehicle body, an inflatable cushion attached to said diffuser, said diffuser having a plurality of openings for allowing gas to flow into the cushion for inflating the latter whereby the cushion assumes a position for receiving impact of the center seat and right-hand seat occupants' torsos, said inflatable cushion having a transverse length substantially greater than the longitudinal length of said diffuser, and baffle means in the form of a sleeve with open sides located within said inflatable cushion and positioned in the path of gas flow from said diffuser, said baffle means having a portion thereof spaced from said diffuser and having a transverse dimension substantially equal to the length dimension of said diffuser so as to cause the full flow of gas from the diffuser to be directed sideways and thereby facilitate filling of the side portions of the inflatable cushion to quickly locate the cushion in front of the center seat occupant.

4. In combination with a vehicle body including a seat having a seat cushion and a seat back for supporting a driver, a center seat occupant and a right-hand seat occupant in seated positions, an instrument panel having a front surface juxtaposed to the seat back and torso of each of the seated occupants, an inflatable restraint system for said center seat occupant and the right-hand seat occupant, said inflatable restraint system being located in the instrument panel substantially opposite the right-hand seat occupant and comprising a housing fixedly mounted to said instrument panel, a gas generator carried by said housing and including a diffuser of a predetermined length with the longitudinal axis thereof being disposed transversely of the vehicle body, a torso cushion attached to said diffuser, a knee cushion located within said torso cushion, said diffuser having a plurality of openings for allowing gas to flow separately into the knee cushion and into the torso cushion for inflating both cushions and whereby the torso cushion assumes a position for receiving impact of the center seat and right-hand seat occupants' torsos, said torso cushion having a transverse length at least double the longitudinal length of said diffuser, and baffle means in the form of a sleeve with open sides surrounding the diffuser and knee cushion and positioned in the path of gas flow from said diffuser, said baffle means being spaced from said diffuser and having a transverse dimension substantially equal to the longitudinal length dimension of said diffuser so as to cause the gas flowing from the diffuser to be directed sideways to fill the side portions of the torso cushion to quickly locate the torso cushion in front of the center seat occupant.

* * * * *